Patented July 9, 1940

2,207,612

UNITED STATES PATENT OFFICE 2,207,612

ETHERS OF SUBSTITUTED ACYL-PHENOLS

Gerald H. Coleman and John W. Zemba, Midland, Mich., assignors to The Dow Chemical Company, Midland, Mich., a corporation of Michigan No Drawing. Application September 14, 1938, Serial No. 229,870

7 Claims. (Cl. 260—592)

The invention relates to hydroxy-alkyl ethers of substituted acyl-phenols, and is particularly concerned with those compounds having the formula

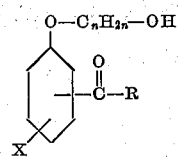

wherein R represents an alkyl radical containing not more than 5 carbon atoms, X represents phenyl, chlorine, bromine, or an alkyl radical containing from 2 to 8 carbon atoms, inclusive, and each $n$ is an integer not greater than 8. These are new compounds and have been found useful as plasticizers in styrene and cellulose ether and ester compositions, and as intermediates in the preparation of complex organic derivatives.

The new compounds are for the most part viscous liquids, but sometimes solidify on standing. They may be prepared by reacting a substituted acyl-phenol with an alkylene chlorohydrin in the presence of an alkali. For example, the acyl-phenol may be dissolved in an excess of aqueous caustic alkali, the solution heated to a moderate temperature, and the alkylene chlorohydrin gradually added with stirring. After the chlorohydrin has been added, heating under reflux may be continued for a period of time sufficient to complete the reaction, after which the reaction mixture is diluted with water and the crude product isolated in any suitable manner. The compounds may also be formed by reacting a suitable acyl-phenol with an alkylene oxide.

The acyl-phenols employed as reactants in the preparation of our new hydroxy-alkyl ethers may be conveniently prepared from the chloro-, bromo-, phenyl-, or alkyl-phenols by reacting an acid anhydride therewith to produce the corresponding ester compound and subsequently rearranging the ester compound with aluminum chloride.

The following examples illustrate certain embodiments of our invention, but are not to be construed as limiting the same:

Example 1

0.32 mol of ethylene chlorohydrin was added portion-wise in two hours to a solution of 0.25 mol of 2-valeryl-ethyl-phenol dissolved in a solution of 0.32 mol of sodium hydroxide in 62.5 milliliters of water at 80° to 85° C., the refluxing temperature of the mixture. The mixture was then agitated and heated for an additional hour and thereafter allowed to stand for several hours at room temperature. The oily layer which separated from solution was fractionally distilled, whereby 0.11 mol of the beta-hydroxy-ethyl ether of 2-valeryl-4-ethyl-phenol was obtained as a light yellow oil, boiling at 184° to 186° C. at 3 millimeters pressure, and having a specific gravity of 1.054 at 20°/4° C.

Example 2

In a similar manner, 0.216 mol of ethylene chlorohydrin, 0.216 mol of 2-hydroxy-5-isovaleryl-diphenyl, and 0.27 mol of sodium hydroxide in 95 milliliters of water were reacted together at 80° to 85° C. over a period of approximately two hours. The reaction mixture was then acidified and the oily layer separated and fractionally distilled to obtain 0.144 mol of the beta-hydroxy-ethyl-ether of 2-hydroxy-5-isovaleryl-diphenyl as a light yellow viscous oil, boiling at 215°–219° C. at 2 millimeters pressure, and having a specific gravity of 1.099 at 35°/4° C.

Example 3

Likewise, 2-acetyl-4-chlorophenol was reacted with sodium hydroxide, water, and ethylene chlorohydrin to obtain the beta-hydroxy-ethyl-ether of 2-acetyl-4-chlorophenol, boiling at approximately 160° to 165° C. at 3 millimeters pressure, and having a melting point of 74° to 74.8° C.

By substituting other acyl-phenols and alkylene halohydrins for those shown in the examples, there may be obtained such compounds as beta-hydroxy-ethyl-ether of 2 - bromo - 4 - propionyl-phenol, beta-hydroxy-ethyl-ether of 4-tertiary - octyl - 6 - acetyl-phenol, beta-hydroxy-ethyl-ether of 2-chloro-4-caproyl-phenol, hydroxy-propyl-ether of 3-phenyl-4-acetyl-phenol, hydroxy-propyl-ether of 2-butyryl - 4 - tertiary-butyl-phenol, hydroxy-amyl-ether of 2-isopropyl-4-acetyl-phenol, hydroxy-octyl-ether of 2-ethyl-4-valeryl-phenol, and the like.

We claim:

1. A compound having the formula

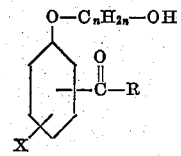

wherein R represents an alkyl radical containing not more than 5 carbon atoms, X represents a member of the group consisting of phenyl, chlorine, bromine, and the alkyl radicals containing from 2 to 8 carbon atoms, inclusive, and $n$ is an integer not greater than 8.

2. A beta-hydroxy-ethyl-ether having the formula

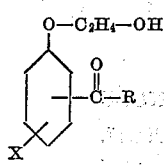

wherein R represents an alkyl radical containing not more than 5 carbon atoms, and X represents a member of the group consisting of phenyl, chlorine, bromine, and the alkyl radicals containing from 2 to 8 carbon atoms, inclusive.

3. A beta-hydroxy-ethyl-ether having the formula

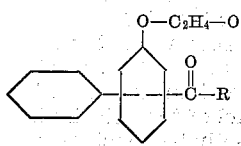

wherein R represents an alkyl radical containing not more than 5 carbon atoms.

4. A beta-hydroxy-ethyl-ether having the formula

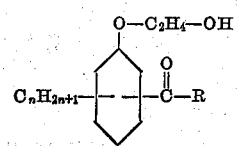

wherein R represents an alkyl radical containing not more than 5 carbon atoms, and $n$ is an integer from 2 to 8, inclusive.

5. The beta-hydroxy-ethyl-ether of 2-normal-valeryl-4-ethyl-phenol.

6. The beta-hydroxy-ethyl-ether of 2-hydroxy-5-isovaleryl-diphenyl.

7. The beta-hydroxy-ethyl-ether of 2-aceto-4-chloro-phenol.

GERALD H. COLEMAN.
JOHN W. ZEMBA.